United States Patent [19]

Baas

[11] Patent Number: 4,907,213
[45] Date of Patent: Mar. 6, 1990

[54] COMPACT-DISK PLAYER ARRANGEMENT FOR READING OUT A TABLE OF CONTENTS AFTER INSERTION OF A COMPACT DISK

[75] Inventor: Dieter Baas, Kehl, Fed. Rep. of Germany

[73] Assignee: Deutsche Thomson-Brandt GmbH, Villingen, Fed. Rep. of Germany

[21] Appl. No.: 149,663

[22] Filed: Jan. 28, 1988

[30] Foreign Application Priority Data

Jan. 30, 1987 [DE] Fed. Rep. of Germany ....... 3702693

[51] Int. Cl.[4] ...................... G11B 17/00; G11B 27/08
[52] U.S. Cl. .......................................... 369/47; 369/32
[58] Field of Search ...................... 369/32, 33, 46, 47; 360/72.1, 72.2

[56] References Cited

U.S. PATENT DOCUMENTS

| 4,689,778 | 8/1987 | Miura et al. | 360/72.1 |
| 4,716,557 | 12/1987 | Otani | 369/32 |
| 4,797,752 | 1/1989 | Giddings | 369/32 |
| 4,817,075 | 3/1989 | Kikuchi et al. | 369/47 |

Primary Examiner—Steven L. Stephan
Attorney, Agent, or Firm—Max Fogiel

[57] ABSTRACT

Compact-disk players read out some of the redundant table of contents on a compact disk and enter the data in a memory. Since the position of the beam of scanning light is random at the commencement of the read-out and entry process, it can in certain situations take longer for the beam to arrive at the first block (A0) in the table of contents, at which entering is to begin.

To decrease the read-out and entry time the beam of light is diverted to the first block (A0) from whatever block it happens to be at at the commencement of the process. In a variant of the process the data are stored commencing with the block that the beam happens to be at at the commencement and ending with the next block with the same content. In a third version the entry commences with the block that the beam happens to be at at the commencement and, when the beam arrives at the last block to be entered, it skips back to the first block (A0) and enters the rest of the data.

22 Claims, 2 Drawing Sheets

COMPACT-DISK PLAYER ARRANGEMENT FOR READING OUT A TABLE OF CONTENTS AFTER INSERTION OF A COMPACT DISK

BACKGROUND OF THE INVENTION

The invention concerns a compact-disk plaYer wherein, once a compact disk has been inserted, the table of contents of the disk is read out and at least some of it entered in a memory.

The article "Zusammenstellen eines CD-Programms" ["Compiling a CD program"], Funkschau 15, 7/18/1986, pages 26-28, describes the kinds of data that are basically stored on a compact disk and how the player processes them.

Every compact disk contains a table of contents, wherein data are stored that provide information as to the number of program blocks stored on the disk, their starting times, and the total playing time of the disk. The individual program blocks are generally pieces of music, although they can also be spoken texts or sound effects for adding sound to motion pictures or slide shows. Up to 99 program blocks can be stored on one compact disk, although there are usually no more than 10 to 20 different pieces on a musical disk.

The table of contents on a compact disk has the format illustrated in the figure. The first block, A0, contains the title of the first piece of music, the second block, A1, that of the last piece of music, and the third block, A2, the total playing time of the disk. The next blocks, D1 through Dn contain the starting times of the individual pieces of music recorded on the disk. Blocks A0, A1, A2, and D1 through Dn are collected into a group, in which the table of contents of the compact disk is stored once.

Since all of the storage space available for the table of contents on the disk is occupied by several of these directly adjacent groups, the data in the table is stored multiply redundant.

While the compact disk is being played, starting-time points D1 through Dn, which constitute the major portion of the data stored in the table of contents, are utilized to calculate the starting times of the individual pieces. Only the more expensive compact-disk players, however, have enough memory addresses to store the total table of contents, and the simpler players can store only some of it, the first 10 of n pieces of music for example. This means that the memory will contain only the first three blocks, A0 through A2, plus blocks D1 through D10, and there is no room for the remaining blocks, D11 through Dn.

To read out a block from the compact disk and store its data in the memory a player takes about 40 milliseconds. Thus, if 99 pieces of music are actually recorded on the disk, reading them out and storing the three blocks A0. A1, and A2 plus the 99 blocks D1 through D99 will take approximately (3 +99)×40 msec=4.08 sec if the beam of light that scans the data happens by chance to be at the beginning of the first block A0 of a group at precisely the instant it begins reading. The probability of such a desirable event, however, is very low.

The example of a compact-disk player that can store the titles of ten pieces of music and of a compact disk that contains 50 pieces of music will now be utilized to illustrate how long the read-out and entry time can be in certain situations.

At the commencement of the read-out and entry process the beam of light may be on block D11, which contains the starting time of the 11th piece of music. The 40 blocks D11 through D50 will have to be scanned before read-out and entry of the blocks A0 through A2 and D1 through D10 in the next group can begin. Since it will take 40×40 msec=1.6 sec to read blocks D11 through D 50 and another 13×40 msec=0.52 sec to read out and enter blocks A0 through A2 and D1 through D10, it will take 1.6+0.52 sec to start playing the first piece of music.

The time that elapses before the first piece of music can be played, however, can be even longer when one block, block D10 for example, is illegible due to a scratch on the disk. In this situation the compact-disk player keeps on reading until it arrives at the block D10 in the next group, which should be legible. Thus, blocks D11 through D50, followed by the blocks A0 through A2 and D1 through D10 in the following groups are read. Since the player needs another 53×50 msec=2.12 sec to read these 40+3+10=53 blocks, the listener must wait approximately 4 sec before he can listen to the first piece of music.

SUMMARY OF THE INVENTION

The object of the invention is accordingly to decrease the time taken by a compact-disk player to read out and enter the table of contents on a compact disk.

This object is attained in accordance with the invention in that the beam of light that scans the data is diverted to the first block in the table of contents from whatever block it happens by chance to be at at the beginning of the read-out and entry process and begins reading and entering the stored data commencing with the first block.

Another means of attaining that object is recited in claim 2. In this embodiment 12. the data in the table of contents are read out commencing with the block the beam of light happens by chance to be at at the commencement of the reading process and ending with the same block in the following group, and are then entered in the memory.

A third means of attaining that object is recited in claim 3. In this embodiment 13. the data in the table of contents are read out commencing with the block the beam of light happens by chance to be at at the commencement of the reading process and ending with the last block that has data to be entered, the data are entered, and the beam of light is diverted from that block to the first block (A0), upon which it will read out and enter the data in the blocks from the first block through the block that it happened by chance to be at at the commencement of the process.

DESCRIPTION OF THE PREFERRED EMBODIMENTS

Figure 1:
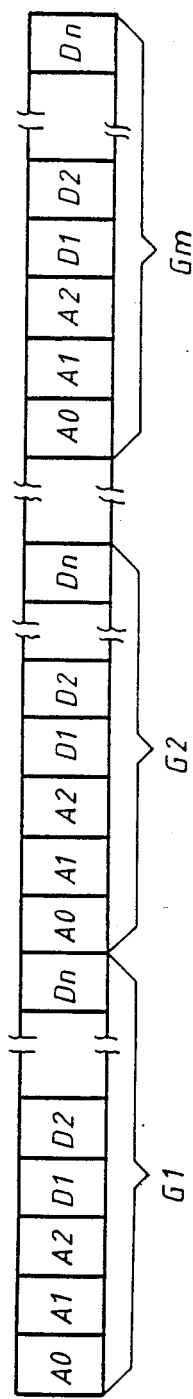
FIG. 1 is a schematic view of the table of contents on a compact disk, in accordance with the present invention.
Figure 2:
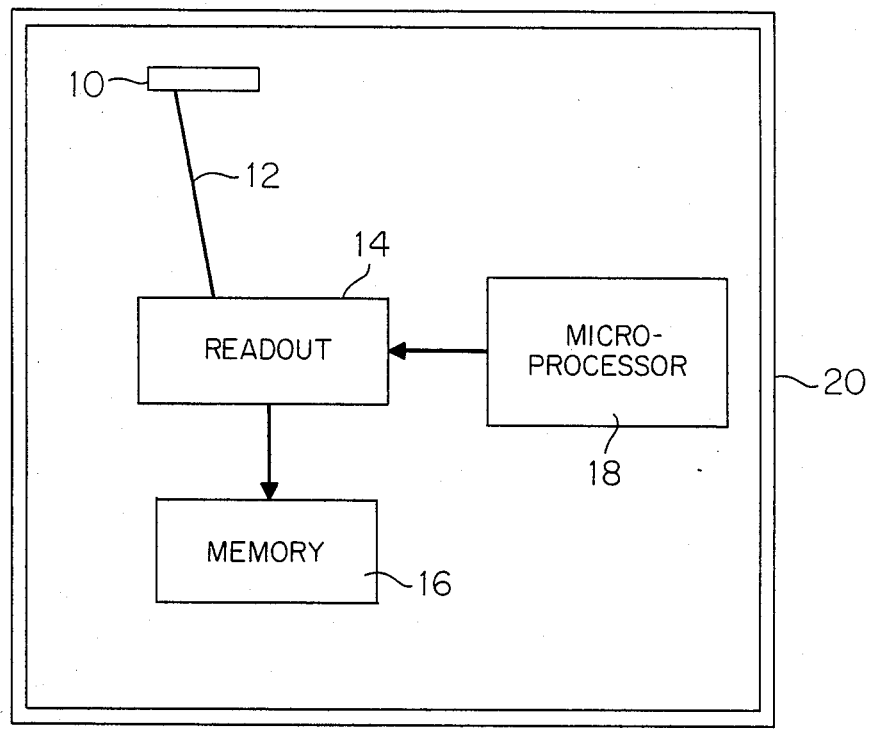
FIG. 2 is a schematic of an arrangement for reading the table of contents shown in FIG. 1.

An embodiment of the invention will now be described with reference to the aforesaid example of a compact-disk player 20 that can store the titles of 10 pieces of music and of a compact disk 10 that has 50 pieces of music recorded on it.

Assume again that the beam of light 12 is focused on block D11 at the commencement of the read-out and entry process. Instead of reading out, by readout 14, blocks D11 through D50 and not beginning to enter the data until arriving at the first block A0 of the next group, the beam skips within the group from block D11 to block A0 and immediately beings reading out and entering blocks A0 through A2 and D1 through D10.

Reading out and entering the thirteen blocks A0 through A2 and D1 through D10 takes exactly $13 \times 40$ msec = 0.52 sec, whereas a listener has to wait 2.12 sec for the first piece of music at the state of the art. The skipping time is relatively short and can in the least favorable case equal the time the disk takes to revolve once—between 110 and 130 msec because it is possible to skip only onto a complete track and not onto fractions of a track.

If as in the aforementioned example block D10 is illegible due to a scratch, the beam of scanning light in the compact-disk player in accordance with the invention will be diverted in a single skip to the block D10 in either a previous or a subsequent group, where it will read out and enter the data. Since the skipping time is negligibly brief, the first piece of music will begin playing in only approximately 0.5 sec, whereas the listener has to wait 4.2 sec in this most unfavorable case at the state of the art.

The distance the beam of light skips can be calculated by two different methods.

In the first approach the number of tracks is calculated from the number of blocks between the blocks A0 and D11 or D10 in one group and the block D10 in the following group. From the 110 to 130 msec it takes a disk to rotate once it will be evident that the length of three blocks more or less equals the distance of one track. Thirteen blocks must be traversed to skip from block D11 to block A0, corresponding to a distance of 13:3 = 4 tracks.

The second approach employs a time grid that is plotted on the disk parallel to the blocks and increased by 3 like a counter with every block. From the value for block D11 it can be calculated how many tracks the beam of light will have to skip to arrive at block A0 for example. This method is essentially more precise.

Since all compact-disk players are equipped with microprocessors, it is especially practical to have the microprocessor 18 carry out the calculations, which saves the expense of additional hardware in that is only necessary to expand the microprocessor program.

In one practical embodiment of the compact-disk player in accordance with the invention groups of defective blocks are stored in a memory 16. For this purpose the initial and final numerals assigned to the defective group in the time grid are stored. Defective blocks or groups can derive for example from scratches or fingerprints on the disk.

The method will now be explained with reference to an example. Assume that one group consists of 10 blocks and that the second group contains defective blocks. The initial numeral in the first group in the time grid is 1 and the final numeral 10. Assigned to the first block in the second group, the group with the defective blocks, is the numeral 11, and the numeral 20 is assigned to the last block. The two numerals 11 and 20 are stored. The player now knows that, when it resumes reading the table of contents, it is to ignore the blocks with the numerals 11 through 20 because they contain defective blocks.

The version recited in claim 2 will now be explained.

The compact-disk player is supposed to store the titles of the first 10 pieces of music. Assume that the beam of light is initially at block D3. Instead of reading out blocks D3 through D50 and not beginning to enter the data in blocks A0 through A2 and D1 through D10 until arriving at the first block A0 in the following group, the data in blocks D3 through D10 are read out and stored beginning with block D3. In the following group, accordingly, only the data in blocks A0 through A2 and blocks D1 and D2 will have to be read out and stored because the data in the remaining blocks D3 through D10 have already been entered.

If the player is capable of storing all 50 pieces of music, the data in blocks D3 through D50 and the data in blocks A0, A1, A2, D1, and D2 in the following group are entered, beginning with those in block D3. If the player is capable of storing all the pieces of music listed in the table of contents on a compact disk, the time taken to read out and enter the data will not depend on what block the beam of light is initially at. Read-out and entering will take exactly the same amount of time it would take if the beam happened by chance to be at first block A0.

When the beam of light in the practical embodiment of the invention recited in claim 2 senses a defective block in one group it will in a practical way skip once or more to the same block in a previous or subsequent group.

In still another practical development defective groups and/or blocks are labeled defective in the player so that the beam of light can skip them during the read-out process.

The embodiment recited in claim 3 will now be discussed.

Assume again that the beam of light is at block D3 and that the compact-disk player is to store the titles of the first 10 pieces of music.

The data in blocks D3 through 10 are read out and stored. The beam of light is then diverted from block D10 to first block A0 in order to read out and enter the data in the remaining blocks A0, A1, A2, D1, and D2.

The beam of light in the embodiment recited in claim 3 can also in a practical way skip once or more to the same block in a previous or subsequent group when it senses a defective block in one group and defective groups and/or blocks can be labeled defective in the player so that the beam of light can skip them during the read-out process.

I claim:

1. A compact-disk player wherein, once a compact disk has been inserted, the table of contents of the disk, which table can consist of several adjacent groups of data (G1, G2, ..., GM), each group containing several blocks of data (A0, A1, A2, D1, ..., Dn) is read out and at least some of it entered into memory, the improvement comprising: a beam of light that scans the table of contents is diverted to a first block in the table of contents from whatever block said beam happens by chance to be at the beginning of a read-out and entry process and begins reading and entering stored data commencing with the first block.

2. A compact-disk player as defined in claim 1, wherein said beam of light senses a defective block within a group in the table of contents during read-out and entry and skips once or more to the same block in a subsequent group.

3. A compact-disk player as defined in claim 1, wherein said beam of light senses a defective block within a group in the table of contents during read-out and entry and skips once or more to the same block in a previous group.

4. A compact-disk player as defined in claim 1, wherein said beam of light skips from one block to another, the number of data tracks between the two blocks being calculated.

5. A compact-disk player as defined in claim 1, wherein said beam of light skips from one block to another, an interval of time between two blocks being determined by a time grid and the extent of the skip being calculated from the interval.

6. A compact-disk player as defined in claim 4, wherein calculations are carried out by a microprocessor.

7. A compact-disk player as defined in claim 1, wherein a group (G1, G2, ..., Gm) containing defective blocks is labeled defective in the player.

8. A compact-disk player as defined in claim 1, wherein defective blocks are so labeled in the player.

9. A compact-disk player as defined in claim 8, wherein defective groups and/or blocks are skipped in the read-out process.

10. A compact-disk player wherein, once a compact disk has been inserted, the table of contents of the disk, which table can consist of several adjacent groups of data (G1, G2, ..., Gm), each group containing several blocks of data (A0, A1, A2, D1, ..., Dn) is read out and at least some of it entered into memory, the improvement comprising: data in the table of contents are read out commencing with a block that a beam of light happens by chance to be at at commencement of a reading process and ending with the same block in a following group, and are then entered into memory.

11. A compact-disk player wherein, once a compact disk has been inserted, the table of contents of the disk, which table can consist of several adjacent groups of data (G1, G2, ..., Gm), each group containing several blocks of data (A0, A1, A2, D1, ..., Dn), is read out and at least some of it entered into memory, the improvement comprising: data in the table of contents are read out commencing with a block a beam of light happens by chance to be at at commencement of a reading process and ending with a last block that has data to be entered, said data being entered, and said beam of light being diverted from said last block to the first block (A0), whereupon said beam of light will read out and enter data in said blocks from the first block through the block that said beam of light happened by chance to be at at the commencement of the process.

12. A method for reducing the time consumed by a compact-disk player to read out and enter data of a table of contents on a compact disk, comprising the steps: inserting a compact disk into a compact disk player; reading out said table of contents comprising a plurality of adjacent groups of data, each of said groups containing a plurality of blocks of data; entering at least part of said table of contents into memory; scanning said table of contents with a beam of light; diverting said beam of light to a first block in said table of contents from whatever block said beam happens by chance to be directed at upon beginning a read-out and entry process; and beginning reading and entering stored data commencing with said first block.

13. A method as defined in claim 12, wherein said beam of light senses a defective block within a group in said table of contents during read-out and entry and skips once or more to the same block in a subsequent group.

14. A method as defined in claim 12, wherein said beam of light senses a defective block within a group in said table of contents during read-out and entry and skips once or more to the same block in a previous group.

15. A method as defined in claim 12, wherein said beam of light skips from one block to another; and calculating the number of data tracks between said one block and said other block to which said beam of light skips.

16. A method as defined in claim 12, wherein said beam of light skips from one block to another block; determining an interval of time between said one block and said other block by a time grid; and calculating an extent of the skip from said interval.

17. A method as defined in claim 15, wherein calculations are carried out by a microprocessor.

18. A method as defined in claim 12, and labeling defective blocks in a group in the player.

19. A method as defined in claim 12, and labeling defective blocks in the player.

20. A method as defined in claim 19, and skipping defective groups and/or blocks in the read-out process.

21. A method for reducing the time consumed by a compact-disk player to read out and enter data of a table of contents on a compact disk, comprising the steps: inserting a compact disk into a compact disk player; reading out said table of contents comprising a plurality of adjacent groups of data, each of said groups containing a plurality of blocks of data; entering at least part of said table of contents into memory; scanning said table of contents with a beam of light; reading out data in said table of contents commencing with a block that said beam of light happens by chance to be directed at upon beginning a read-out process and ending with the same block in a subsequent group; and entering into memory the read-out data.

22. A method for reducing the time consumed by a compact-disk player to read out and enter data of a table of contents on a compact disk, comprising the step: inserting a compact disk into a compact disk player; reading out said table of contents comprising a plurality of adjacent groups of data, each of said groups containing a plurality of blocks of data; entering at least part of said table of contents into memory; scanning said table of contents with a beam of light; reading out data in said table of contents beginning with a block that said beam of light happens by chance to be directed at upon beginning a read-out process and ending with a last block that has data to be entered; entering the read-out data into memory; diverting said beam of light from said last block to the first block; reading out and entering into memory data in said blocks by said beam of light from the first block through the block that said beam of light happens by chance to be directed at upon beginning said process.

* * * * *